US006271532B1

(12) United States Patent
Trokhan et al.

(10) Patent No.: US 6,271,532 B1
(45) **Date of Patent: *Aug. 7, 2001**

(54) APPARATUS FOR GENERATING CONTROLLED RADIATION FOR CURING PHOTOSENSITIVE RESIN

(75) Inventors: Paul Dennis Trokhan, Hamilton; Vladimir Vitenberg, Cincinnati, both of OH (US)

(73) Assignee: The Procter & Gamble Company, Cincinnati, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/958,540

(22) Filed: Oct. 27, 1997

Related U.S. Application Data

(63) Continuation of application No. 08/858,334, filed on May 19, 1997, now Pat. No. 5,962,860.

(51) Int. Cl.[7] .................................................... G02B 17/00
(52) U.S. Cl. ........................................................ 250/504 R
(58) Field of Search ............................ 250/504 R, 503.1, 250/455.1, 493.1; 359/856–859, 861–863; 372/99

(56) References Cited

U.S. PATENT DOCUMENTS

| | | | |
|---|---|---|---|
| 3,275,820 | 9/1966 | Szarkowski ....................... | 240/46.31 |
| 3,983,039 | 9/1976 | Eastland ........................... | 250/504 R |
| 4,005,135 | 1/1977 | Helding . | |
| 4,010,374 | 3/1977 | Ramler . | |
| 4,037,112 | 7/1977 | Ramler et al. . | |

(List continued on next page.)

FOREIGN PATENT DOCUMENTS

| | | |
|---|---|---|
| 3049 040 A1 | 4/1982 | (DE) . |
| 3437 192 A1 | 4/1986 | (DE) . |
| G 90 14 652.2 | 4/1992 | (DE) . |
| 0 437 847 A1 | 7/1991 | (EP) . |
| 0 756 035 A1 | 1/1997 | (EP) . |
| 627376 | 10/1927 | (FR) . |
| 2626134 | 7/1989 | (FR) . |
| 2 284 469 A | 12/1993 | (GB) . |
| WO 91/14558 | 10/1991 | (WO) . |
| WO 92/17733 | 10/1992 | (WO) . |

OTHER PUBLICATIONS

Literature from Fusion UV Curing Systems: EPIQ 6000: The Next Dimesnion in UV Curing: Fusion Ultraviolet Curing Systems Industrial Power Supply: Fusion UV Curing Systems DRS 111 & DRS 120.

(List continued on next page.)

*Primary Examiner*—Kiet T. Nguyen
(74) *Attorney, Agent, or Firm*—Vladimir Vitenberg; Larry L. Huston; Tara M. Rosnell

(57) ABSTRACT

An apparatus for generating controlled radiation for curing a photosensitive resin is disclosed. The apparatus comprises a source of radiation and an elongate reflector for directing said radiation in at least one radiating direction. The reflector has two ends spaced apart in a longitudinal direction, and a cross-section perpendicular to the longitudinal direction. The reflector further has an inner surface and an outer surface. The inner surface comprises a plurality of elongate reflective facets oriented parallel to the longitudinal direction. The reflective facets are adjustable in the cross-section for directing the curing radiation substantially parallel to at least one radiating direction. Optionally, a plurality of collimating elements disposed between the ends of the reflector may be utilized for controlling an angle of the curing radiation relative to the longitudinal direction. A radiation management device, preferably comprising a mini-reflector, juxtaposed with the source of radiation may also be utilized.

21 Claims, 7 Drawing Sheets

U.S. PATENT DOCUMENTS

| | | | | |
|---|---|---|---|---|
| 4,208,587 | | 6/1980 | Eastlund et al. . | |
| 4,389,115 | | 6/1983 | Richter . | |
| 4,444,487 | | 4/1984 | Miller et al. . | |
| 4,499,529 | | 2/1985 | Figueroa | 362/283 |
| 4,514,345 | | 4/1985 | Johnson et al. | 264/22 |
| 4,528,239 | | 7/1985 | Trokhan | 428/247 |
| 4,529,480 | | 7/1985 | Trokhan | 162/109 |
| 4,637,859 | | 1/1987 | Trokhan | 162/109 |
| 4,667,112 | * | 5/1987 | Grossman | 250/503.1 |
| 4,917,447 | * | 4/1990 | Newnam | 250/504 R |
| 5,334,289 | | 8/1994 | Trokhan et al. | 162/358.2 |
| 5,514,523 | | 5/1996 | Trokhan et al. | 430/320 |
| 5,742,066 | * | 4/1998 | Cavestri | 250/504 R |
| 5,832,362 | | 11/1998 | Trokhan . | |
| 5,962,860 | | 10/1999 | Trokhan et al. . | |

OTHER PUBLICATIONS

Conveyors; Fusion Systems Benchtop Conveyor Model MC–6; Fusion Ultraviolet Curing Systems Model F450; Fusion Ultraviolet Curing Systems Model F300; Fusion Focus, vol. 5/No. 1/Sep., 1985.

Fusion's Super Six (F200R) Ultraviolet Curing System; Fusion's Conveyorized Ultraviolet Curing Systems.

Fusion's Conveyorized Ultraviolet Curing Systems for Flat Production Lines; and The F450 Lamp System: Graphic Results.

Literature from Fusion Semiconductor Systems: For a Look at the Future of Multilayer Processing and Photoresist Stabilization . . . Turn on the Microlite™; Introducing the MICROLITE™ 150 PC Photostabilizer for 6–inch Wafers; and MICROLITE™: Now You Can Be More Critical.

* cited by examiner

APPARATUS FOR GENERATING CONTROLLED RADIATION FOR CURING PHOTOSENSITIVE RESIN

This is a continuation of application Ser. No. 08/858,334 filed on May 19, 1997, now U.S. Pat. No. 5,962,860.

FIELD OF THE INVENTION

The present invention is related to processes of making papermaking belts comprising a reinforcing structure joined to a resinous framework. More particularly, the present invention is concerned with an apparatus for curing a photosensitive resin to produce a resinous framework of a papermaking belt, which apparatus controls direction and angle of accidence of a curing radiation.

BACKGROUND OF THE INVENTION

Paper products are used for a variety of purposes. Paper towels, facial tissues, toilet tissues, and the like are in constant use in modern industrialized societies. The large demand for such paper products has created a demand for improved versions of the products.

Generally, the papermaking process includes several steps. An aqueous dispersion of the papermaking fibers is formed into an embryonic web on a foraminous member, such as a Fourdrinier wire, or a twin wire paper machine, where initial dewatering and fiber rearrangement occurs.

In a through-air-drying process, after an initial dewatering, the embryonic web is transported to a through-air-drying belt comprising an air pervious deflection member. The deflection member may comprise a patterned resinous framework having a plurality of deflection conduits through which air may flow under a differential pressure. The resinous framework is joined to and extends outwardly from a woven reinforcing structure. The papermaking fibers in the embryonic web are deflected into the deflection conduits, and water is removed through the deflection conduits to form an intermediate web. The resulting intermediate web is then dried at the final drying stage at which the portion of the web registered with the resinous framework may be subjected to imprinting—to form a multi-region structure.

Through-air drying papermaking belts comprising a reinforcing structure and a resinous framework are described in commonly assigned U.S. Pat. No. 4,514,345 issued to Johnson et al. on Apr. 30, 1985; U.S. Pat. No. 4,528,239 issued to Trokhan on Jul. 9, 1985; U.S. Pat. No. 4,529,480 issued to Trokhan on Jul. 16, 1985; U.S. Pat. No. 4,637,859 issued to Trokhan on Jan. 20, 1987; U.S. Pat. No. 5,334,289 issued to Trokhan et al on Aug. 2, 1994. The foregoing patents are incorporated herein by reference for the purpose of showing preferred constructions of through-air drying papermaking belts. Such belts have been used to produce commercially successful products such as Bounty paper towels and Charmin Ultra toilet tissue, both produced and sold by the instant assignee.

Presently, the resinous framework of a through-air drying papermaking belt is made by processes which include curing a photosensitive resin with UV radiation according to a desired pattern. Commonly assigned U.S. Pat. No. 5,514,523, issued on May 7, 1996 to Trokhan et al. and incorporated by reference herein, discloses one method of making the papermaking belt using differential light transmission techniques. To make a belt comprising a photosensitive resin, a coating of the liquid photosensitive resin is applied to the reinforcing structure. Then, a mask in which opaque regions and transparent regions define a pre-selected pattern is positioned between the coating and a source of radiation, such as UV light. The curing is performed by exposing the coating of the liquid photosensitive resin to the UV radiation from the radiation source through the mask. The curing UV radiation passing through the transparent regions of the mask cure (i.e., solidify) the resin in the exposed areas to form knuckles extending from the reinforcing structure. The unexposed areas (i.e., the areas corresponding to the opaque regions of the mask) remain fluid, i.e., uncured, and are subsequently removed.

The angle of incidence of the radiation has an important effect on the presence or absence of taper in the walls of the conduits of the papermaking belt. Radiation having greater parallelism produces less tapered (or more nearly vertical) conduit walls. As the conduits become more vertical, the papermaking belt has a higher air permeability, at a given knuckle area, relative to a papermaking belt having more tapered conduit walls.

At the same time, in some instances it may be desirable to subject a photosensitive resin to curing at various angles of radiation. For example, it may be desirable to produce a resinous framework having slightly tapered knuckles because such knuckles are more durable under pressure. In other instances, a particular three-dimensional design of a resinous framework may be accomplished by using various angles of radiation.

The current apparatuses for curing the resin to produce the papermaking belts comprising the reinforcing structure and the resinous framework include a radiation source (i.e., a bulb) and a reflector having an elliptical shape. Bulbs of the currently used apparatuses need microwave energy to operate. The elliptical shape of the reflector has been chosen because the elliptical shape and its attendant volume helps to maximize the coupling of microwave energy necessary for the bulbs to operate most efficiently. While the elliptical shape of the reflectors of the prior art is efficient with respect to microwave coupling, the elliptical shape of the reflector generates non-parallel, highly off-axis, or "scattered," rays of radiation. The elliptical shape is thus inefficient for curing the photosensitive resin comprising the framework. So far, as we can determine, the equipment manufacturers have not been able to design a reflector that would maximize microwave energy, and at the same time, generate parallel radiation which could be directed in a certain predetermined direction for the most efficient curing of the resin and, at the same time, produce an acceptable longitudinal uniformity of the radiation. In some cases, space limitations my also influence the shape of the reflector. Therefore, a means of controlling the angle of incidence of the curing radiation independent of reflector's geometry is required.

One of the means of controlling the angle of incidence of the radiation is a subtractive collimator. The subtractive collimator is, in effect, an angular distribution filter which blocks the UV radiation rays in directions other than those desired. A common subtractive collimator comprises a dark-colored metal device formed in the shape of a series of channels through which the light rays may pass in the desired direction. U.S. Pat. No. 5,514,523 cited above and incorporated herein by reference discloses a method of making the papermaking belt utilizing the subtractive collimator.

While the subtractive collimator helps to orient the radiation rays in the desired direction by blocking the rays which have undesired directions, the total radiation energy that reaches the photosensitive resin to be cured is reduced because of loss of the radiation energy in the subtractive collimator.

Therefore, it is an object of the present invention to provide an apparatus for curing a photosensitive resin, which apparatus allows to control an angle of incidence of curing radiation.

It is another object of the present invention to provide an apparatus for curing a photosensitive resin, comprising a plurality of adjustable reflective facets for directing curing radiation in at least one predetermined radiating direction.

It is also an object of the present invention to provide an improved apparatus for curing a photosensitive resin for producing a papermaking belt having resinous framework, which apparatus significantly reduces the loss of the curing energy.

It is a further object of the present invention to eliminate interdependency between the reflector's shape and direction or directions of the reflected radiation.

SUMMARY OF THE INVENTION

The apparatus of the present invention for generating controlled radiation for curing a photosensitive resin comprises two primary elements: an elongate reflector and a source of radiation.

The reflector has a first end and a second end, the ends being mutually opposed and spaced apart from each other in a longitudinal direction. The reflector may have various geometrical configurations in a cross-section which is perpendicular to the longitudinal direction. The reflector may be comprised of one or more sections which are movable relative each other in the cross-section.

The reflector has an inner surface and an outer surface. Preferably, the inner surface of the reflector is flexible. The inner surface is comprised of a plurality of elongate reflective facets oriented in the longitudinal direction. Viewed in the cross-section, the reflective facets are adjustable for directing the curing radiation in at least one predetermined radiating direction.

In one embodiment, the reflector comprises three sections: a first section, a second section movably connected to the first section, and a third section movably connected to the second section. The first section has a first plurality of reflective facets for directing the radiation substantially parallel to a first radiating direction; the second section has a second plurality of reflective facets for directing the radiation substantially parallel to a second radiating direction; and the third section has a third plurality of reflective facets for directing the radiation substantially parallel to a third radiating direction. The first plurality of reflective facets forms a first inner surface; the second plurality of reflective facets forms a second inner surface; and the third plurality of reflective facets forms the third inner surface. Each of the pluralities of reflective facets can be adjusted such as to form a corresponding inner surface having a cross-sectional configuration preferably comprising an essentially parabolic or circular macro-scale shape, i.e., having an essentially parabolic or circular optical effect. Thus, each of the sections of the reflector is able to direct the curing radiation in at least one predetermined radiating direction.

The sections of the reflector and/or the individual reflective facets may be arranged such that the first radiating direction, the second radiating direction, and the third radiating direction are parallel, i.e., the first, the second, and the third pluralities of reflective facets direct radiation in the same direction. Alternatively, the sections of the reflector and/or the individual reflective facets may be arranged such that the first radiating direction, the second radiating direction, and the third radiating direction are not parallel. Of course, the sections of the reflector and/or the individual reflective facets may be arranged such that any one of the first, the second, and the third radiating directions is parallel to one of the other two radiating directions.

The source of radiation is elongate in the longitudinal direction and is preferably an elongate exposure lamp, or bulb, extending in the longitudinal direction between the first and the second ends of the reflector. The source of radiation is selected to provide actinic radiation primarily within the wavelength which causes curing of a liquid photosensitive resin to produce a resinous framework. That wavelength is a characteristic of the liquid photosensitive resin. When the liquid photosensitive resin is exposed to the radiation of the appropriate wavelength, curing is induced in the exposed portions of the resin. Preferably, the source of radiation is movable in the cross-section.

Optionally, the apparatus of the present invention may have a radiation management device juxtaposed with the source of radiation. The radiation management device preferably comprises an elongate mini-reflector having a concave cross-sectional shape and a reflective surface facing the source of radiation. The radiation management device directs some of the radiation emitted by the source of radiation towards the reflective facets. Alternatively or additionally, the radiation management device may comprise a non-reflective device which blocks some of the radiation emitted by the source of radiation in the directions other than those which are desired (i.e., other than those which are directed towards the reflective facets). The radiation management device may be stationary relative the source of radiation. Preferably, however, the radiation management device is rotatable relative the source of radiation. The radiation management device may be extendible in the cross-section.

Optionally, the apparatus of the present invention may have a plurality of collimating elements, disposed between the first and the second ends of the reflector. The collimating elements control the angle of the curing radiation relative to the longitudinal direction. The collimating elements having subtractive surfaces are subtractive collimating elements; and the collimating elements having reflective surfaces are reflective collimating elements.

DETAILED DESCRIPTION OF THE INVENTION

Figure 1:
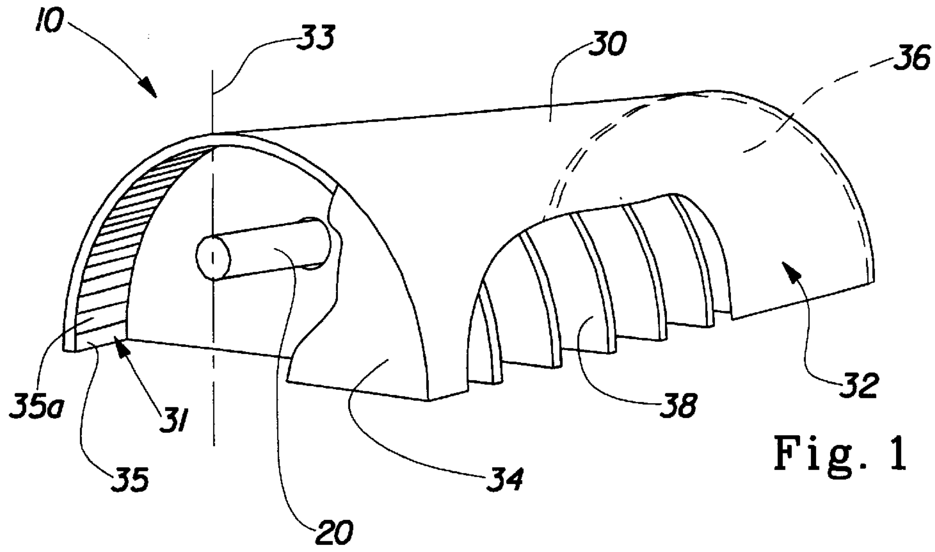
FIG. 1 is a perspective view of one embodiment of the apparatus of the present invention, comprising a reflector having a concave cross-sectional configuration and shown partially in cutaway.
Figure 2:
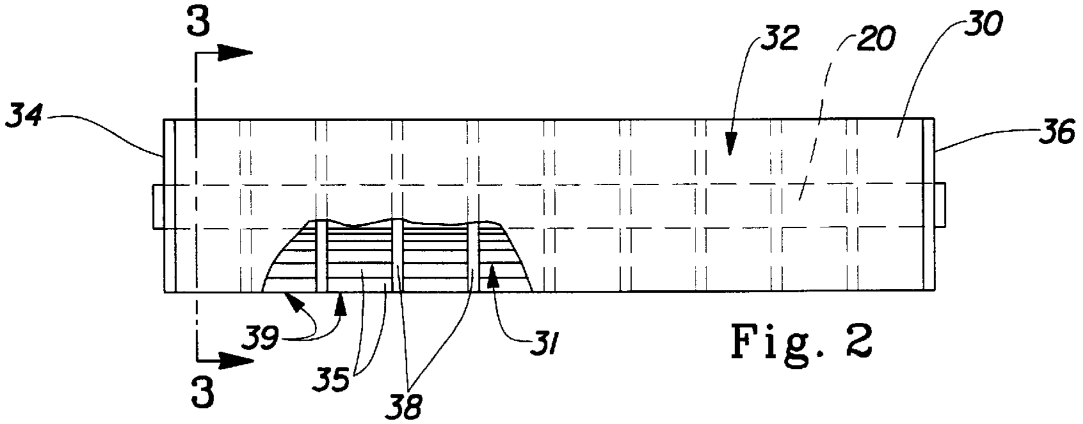
FIG. 2 is a schematic side elevational view of the apparatus shown in FIG. 1 and shown partially in cutaway.
Figure 3:
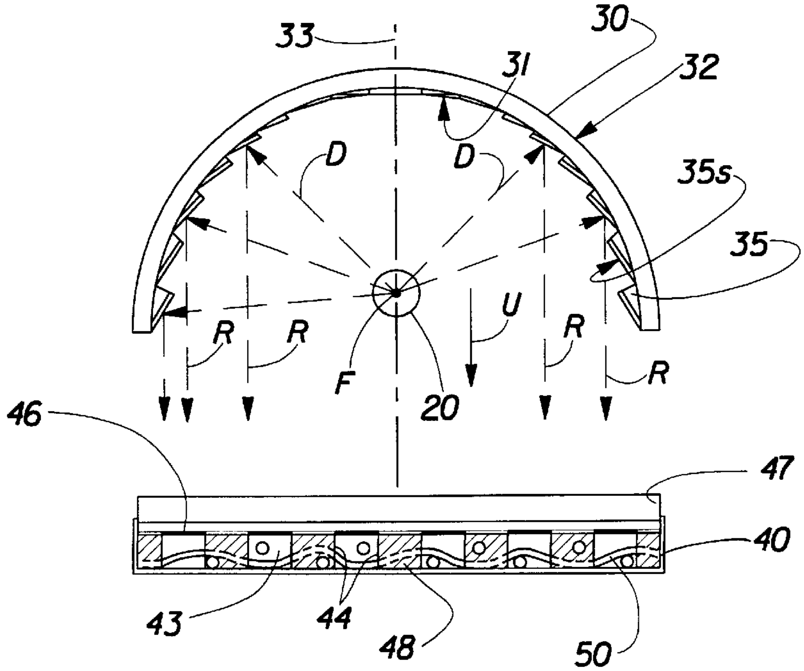
FIG. 3 is a schematic cross-sectional view of the apparatus of the present invention taken along line 3–3 of FIG. 2.

FIGS. 1–3 schematically show one embodiment of an apparatus 10 of the present invention for generating controlled radiation. The apparatus 10 may be utilized for curing a photosensitive resin used for producing a resinous framework of through-air drying papermaking belts. The apparatus 10 of the present invention comprises two primary elements: an elongate reflector 30 and a source of radiation 20.

Figure 6:
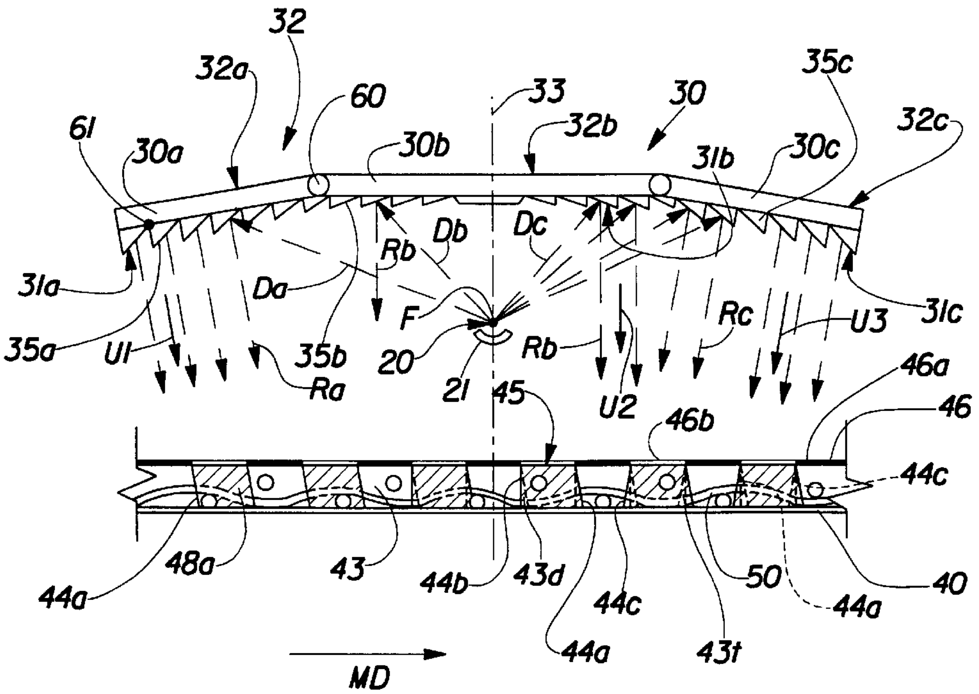
FIG. 6 is a schematic cross-sectional view of the apparatus shown in FIG. 5, showing a multi-sectional reflector in a concave position, and also showing a photosensitive resin in the machine direction.
Figure 7:
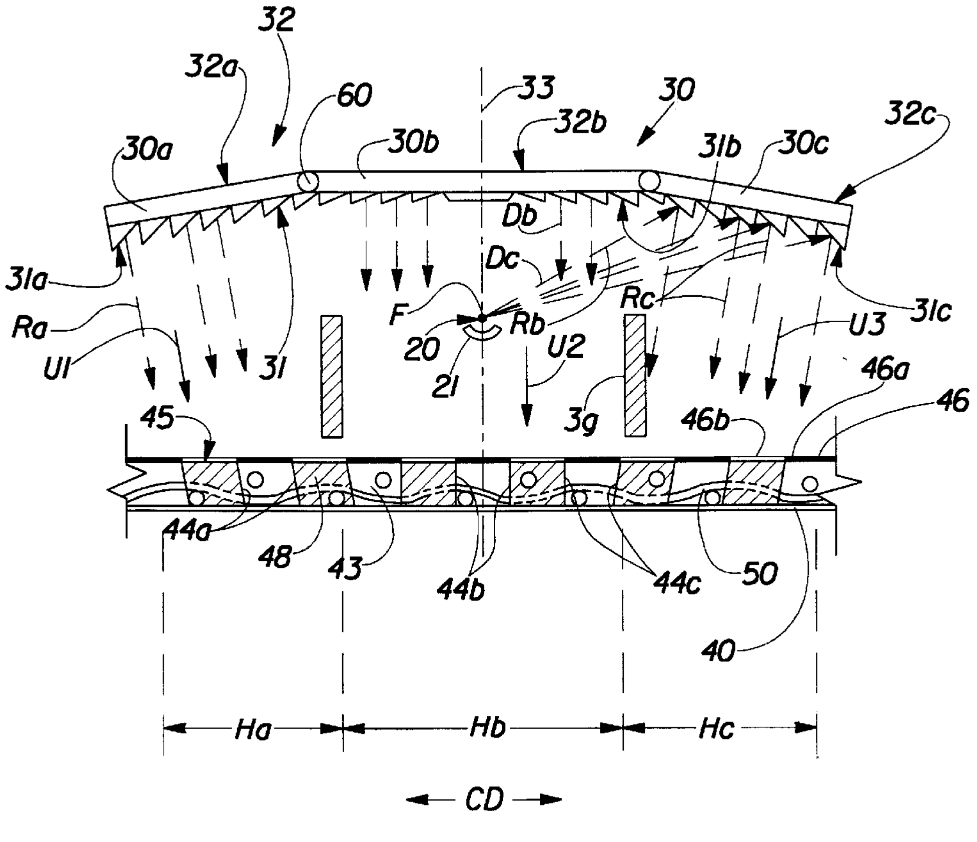
FIG. 7 is a schematic cross-sectional view similar to that shown in FIG. 6, and also showing a photosensitive resin in the cross-machine direction.
Figure 8:
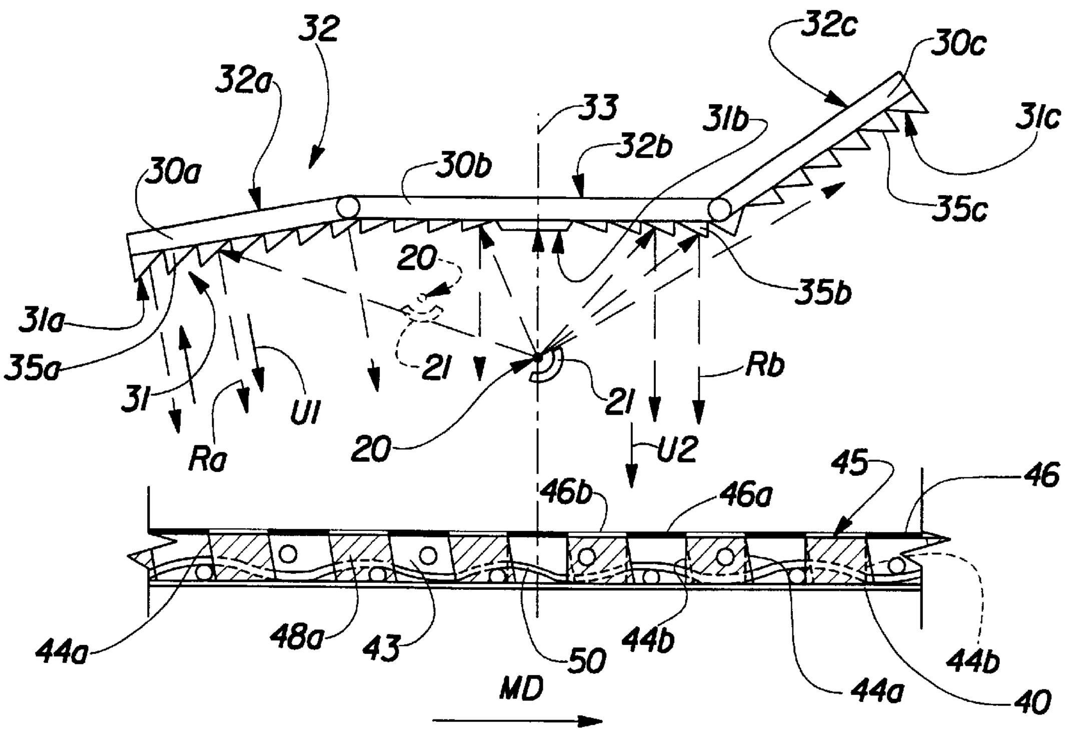
FIG. 8 is a schematic cross-sectional view similar to that shown in FIG. 6, and also showing one of the sections of the reflector in a non-reflecting position.
Figure 9:
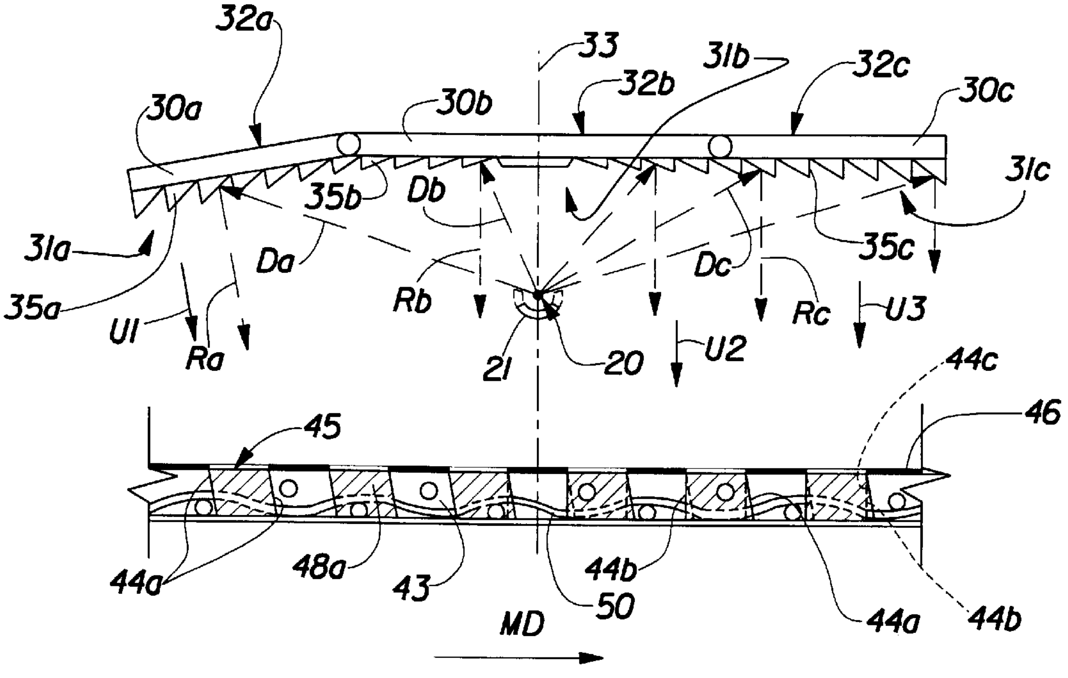
FIG. 9 is a schematic cross-sectional view similar to that shown in FIG. 6, and also showing two sections of the reflector directing radiation in the same direction.

As illustrated in FIGS. 1 and 2, the elongate reflector, or simply "reflector," 30 has a pair of ends: a first end 34 and a second end 36. The ends 34 and 36 are mutually opposed and spaced apart from each other in a longitudinal direction. In papermaking, directions are normally defined relative to "machine direction," or "MD," and "cross-machine direction," or "CD." Machine direction MD refers to that direction which is parallel to the flow of the web (and therefore—papermaking belt) through the papermaking equipment. Cross-machine direction CD is perpendicular to the machine direction and parallel to a surface of a papermaking belt. In some Figures of the present Application, these directions are indicated by the directional arrows "MD" and "CD." The apparatus 10 may be oriented such that its longitudinal direction is substantially perpendicular to the machine direction MD and substantially parallel to the cross-machine direction CD, as shown in FIGS. 6, 8, and 9. Alternatively, he apparatus 10 my be oriented such that its longitudinal direction is substantially perpendicular to a cross-machine direction CD and substantially parallel to the machine direction MD, as shown in FIG. 7. The effect of the different orientations of the apparatus 10 relative to the machine direction MD and the cross-machine direction CD will be discussed in detail hereinbelow.

According to the present invention, the reflector 30 may have various geometrical configurations in a cross-section.

Figure 5:
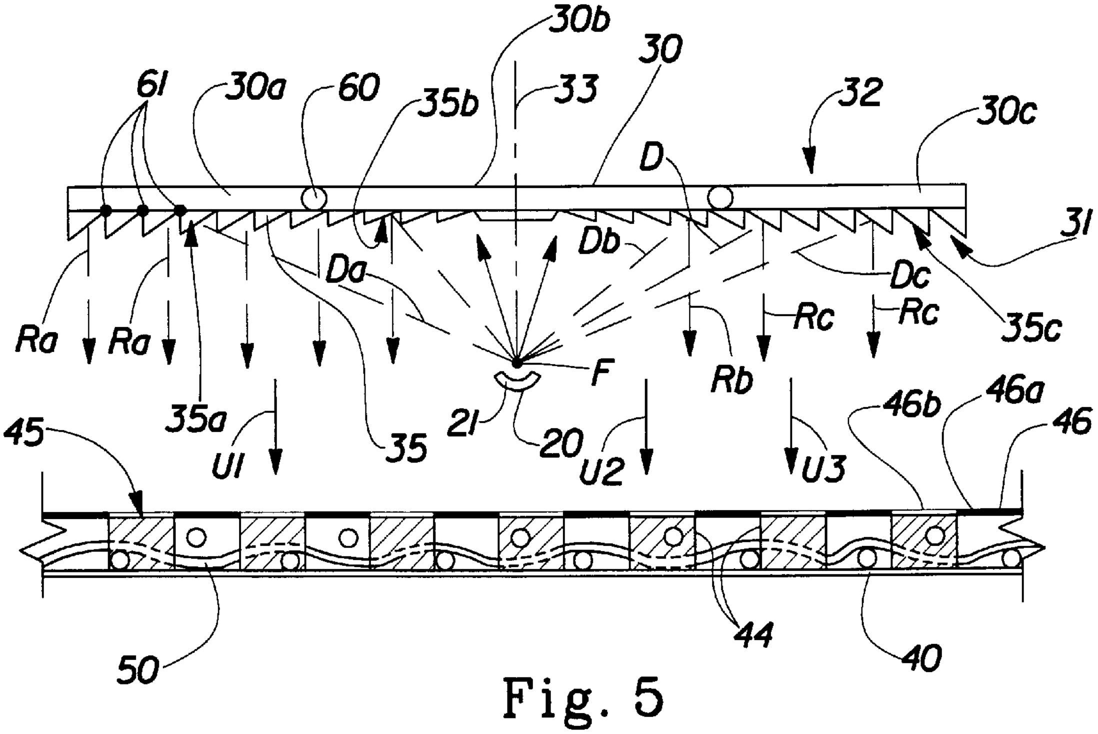
FIG. 5 is a schematic cross-sectional view of the apparatus of the present invention comprising a multi-sectional reflector in a substantially planar position, and also showing a photosensitive resin being cured.

As used herein, the term "cross-section"0 defines that cross-section of the reflector 30, which is formed by an imaginary cross-sectional plane perpendicular to the longitudinal direction. Also, the reflector 30 may be comprised of one or more sections which are movable relative each other. FIG. 3 shows the reflector 30 comprising one section having one generally concave cross-sectional configuration. FIGS. 5 –9 show the reflector 30 comprising three sections: 30*a*, 30*b*, and 3*c*, each of these sections having a substantially planar cross-sectional configuration. In FIG. 5, the movable sections of the reflector 30 are arranged such that the reflector 30 is in a substantially planar position in its cross-section. FIGS. 6 and 7 show the reflector 30 in a generally concave position in its cross-section.

Preferably, the cross-section of the reflector 30 shown in FIGS. 3 and 5–9 has a cross-sectional axis 33. Because the cross-section of the reflector 30 is perpendicular to the longitudinal direction, the cross-sectional axis 33 is also perpendicular to the longitudinal direction. As used herein, the cross-sectional axis 33 is an imaginary straight line with respect to which the cross-section of the reflector 30 has at least one arrangement in which the cross-section of the reflector 30 is bilaterally symmetrical, as shown in FIGS. 3, 5, 6, and 7. One skilled in the art will recognize that in the reflector 30 comprising more than one section movably connected to each other, as shown in FIGS. 5–9, the sections 30*a*, 30*b*, 30*c* may be positioned such that the reflector 30 is not bilaterally symmetrical relative to the cross-sectional axis 33, as shown in FIGS. 8 and 9. The existence of the cross-sectional axis is preferable but not necessary. The reflector 30 having an asymmetric cross-section might not have the cross-sectional axis 33 as it is defined hereinabove. Still, such a reflector 30 having an asymmetrical cross-section is also included in the scope of the present invention.

The reflector 30 has an inner surface 31 and an outer surface 32. The outer surface 32 may comprise a frame and a mounting means (not shown) for mounting the reflector 30 to a certain external structure. The inner surface 31 is a reflective surface of the reflector 30 and is preferably flexible. The inner surface 31 is comprised of a plurality of elongate reflective facets 35 oriented in the longitudinal direction between the first end 34 and the second end 36 of the reflector 30. Each reflective facet, or simply "facet," 35 has its own reflective surface 35*s*. Viewed in the cross-section, the facets 35 are individually adjustable. The facets 35 are adjustable for directing the curing radiation in at least one predetermined radiating direction. As used herein, the term "radiating direction" defines a direction which is substantially parallel to a majority of reflected rays generated by a plurality of reflective facets 35. For example, in FIG. 3, the facets 35 are positioned such as to direct a majority of reflected radiation R substantially parallel to a radiating direction U.

Preferably, the facets 35 are rotatably adjustable in the cross-section. However, other means of adjusting the individual facets 35 in the cross-section of the reflector 30 may be utilized. Adjustability of the reflective facets 35 in the cross-section makes the inner surface 31 of the reflector 30 flexible in the cross-section. Of course, the reflector 30 itself may be flexible in the cross-section, without regard to the adjustability of the reflective facets 35.

As used herein, the terms "radiation" and "ray(s)" are synonymous in a physical sense. In several instances, it is convenient to use the term "ray(s)" as more descriptive for the illustrative purposes, especially in conjunction with the directional arrows D and R. Likewise, a reference symbol "D" generally indicates direct radiation (direct ray(s)), and a reference symbol "R" indicates reflected radiation (reflected ray(s)). Reference symbols "a," "b," and "c" following the symbols "D" and "R" distinguish (where relevant) the directions of the radiation R and D in several embodiments shown in the Figures of the present Application.

As used herein, a "common focal point," or "common focus," F defines the point in the cross-section, at which point the source of radiation 20 must be disposed in order to cause original direct rays D generated by the source of radiation 20 to reflect from the facets 35 such that reflected rays R are substantially parallel to at least one predetermined radiating direction U, as best shown in FIG. 3.

FIG. 3 shows the embodiment in which the concave reflector 30 directs the reflected radiation R in one radiating direction U which is parallel to the cross-sectional axis 33. In this embodiment, the plurality of facets 35 forms the inner surface 31 having a cross-sectional configuration preferably comprising an essentially parabolic or circular macro-scale shape. For the purposes of the present invention, the difference between the parabolic macro-scale shape and the circular macro-scale shape is essentially indistinguishable, as will be explained hereinbelow.

As used herein, the terms "essentially circular macro-scale shape" or "essentially parabolic macro-scale shape" define an overall cross-sectional shape of the inner surface 31 of the reflector 30 when the cross-section of the inner surface 31 is viewed or considered as a whole with regard to its optical effect. In other words, even if an overall geometrical cross-sectional shape of the inner surface 31 is not "essentially parabolic/circular," the inner surface 31 may still have the essentially parabolic/circular macro-scale shape (i.e., the inner surface 31 may still function as if it were parabolic/circular in its geometrical shape). It does not exclude, however, the inner surface 31 having a geometrically essentially parabolic/circular shape in the cross-section. It should also be recognized that the deviations from the absolute circular or parabolic overall shape (i.e., absolute circular or parabolic optical effect) are tolerable, although not preferred, as long as the deviations are not substantial enough to adversely affect the performance of the reflector 30. Similarly, it should be recognized that possible transitional areas between two or more adjacent facets 35 are also tolerable, if these transitional areas do not adversely affect the performance of the reflector 30. In contrast with the cross-sectional "macro-scale shape" of the inner surface 31, a cross-sectional shape of the individual facet 35, and particularly the shape of its reflective surface 35*s*, defines a "micro-scale shape" of the inner surface 31.

As best shown in FIG. 3, when the common focal point F is located at the cross-sectional axis 33, the cross-sectional axis 33 coincides with an optical axis of the parabolic or circular macro-scale shape of the inner surface 31 created by the plurality of the reflective facets 35. One skilled in the art will recognize that paraxial parallel rays are normally reflected from a concave spherical (i.e., circular in the cross-section) mirror through the focal point F which is disposed at the mirror's optical axis at the distance equal half of the mirror's radius from the mirror's surface. As used herein, the paraxial rays are those direct rays D generated by the source of radiation 20 that arrive at comparatively shallow angles with respect to the optical axis of the reflector 30.

Figure 4:
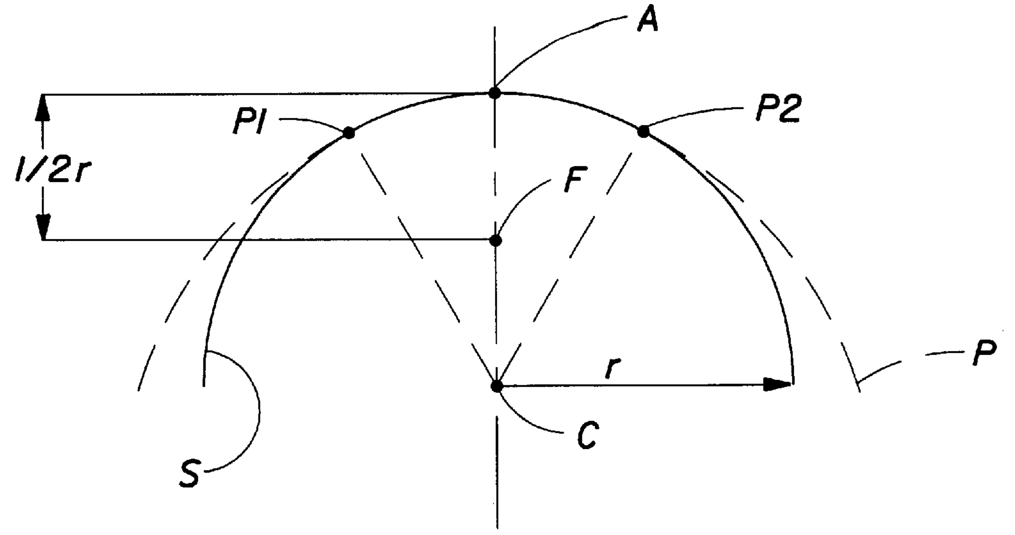
FIG. 4 is a schematic cross-sectional view showing comparison of a circular mirror and a parabolic mirror.

FIG. 4 illustrates what is meant by the "paraxial rays." In FIG. 4, the symbol "S" designates a circle (circular mirror) having its center at the point "C" and its origin at the point "A." The symbol "P" designates a parabola (parabolic mirror) having its focus at the point "F" and its vertex at the point "A." As FIG. 4 illustrates, the parabola P and the circle S have very close (in fact, almost indistinguishable) shapes between points "P1" and "P2." Beyond the points P1 and P2, significant respective deviations of the shapes of the parabolic mirror P and the circular mirror S begin. The subtended region defined by the lines interconnecting the points P1—C—P2 is a "paraxial region," i.e., the region in the immediate vicinity of the common optical axis of the circle S and the parabola P, where the configuration of the circle S and the configuration of the parabola P are essentially indistinguishable for all practical purposes. Those direct rays D which are within the paraxial region are the paraxial rays. Eugene Hecht, *Optics*, Second Edition, page 159, Copyright© 1987, 1974 by Addison-Wesley Publishing Company, Inc. This book is incorporated by reference herein for the purpose of showing comparison (graphical and mathematical) of parabolic mirrors and circular mirrors. It should be noted that while Hecht uses a definition "spherical mirror," the Applicant believes that in the present Application, especially in the context of the cross-section, the definition "circular mirror" is more precise and more consistent with the definition "parabolic mirror," both "parabola" and "circle" being planar geometrical figures. As used herein, the term "circular mirror" includes a mirror having a cross-section formed by a circular arc up to 180 degrees. It should be understood, however, that three-dimensional spherical mirrors and three-dimensional paraboloid mirrors are also included in the scope of the present invention.

FIGS. 5–9 show the embodiment of the apparatus 10, in which the reflector 30 comprises three sections: a first section 30*a*, a second section 30*b* movably connected to the first section 30*a*, and a third section 30*c* movably connected to the second section 30*c*. Any means of movable connection of the sections 30*a*, 30*b*, 30*c* may be utilized in the present invention. One example of movable connection is pivotal connection with a pivot 60 shown in FIGS. 5–9.

The first section 30*a* has a first inner surface 31*a* comprised of a first plurality of reflective facets 35*a* for directing a radiation Ra (i.e. reflecting a direct radiation Da) substantially parallel to a first radiating direction U1; the second section 30*b* has a second inner surface 31*b* comprised of a second plurality of reflective facets 35*b* for directing a radiation Rb (i.e. reflecting a direct radiation Db) substantially parallel to a second radiating direction U2; and the third section 30*c* has a third inner surface 31*c* comprised of a third plurality of reflective facets 35*c* for directing a radiation Rc (i.e. reflecting a direct radiation Dc) substantially parallel to a third radiating direction U3. Each of the reflective facets 35 can be adjusted such that each of the pluralities 35*a*, 35*b*, 35*c* form the corresponding inner 31*a*, 31*b*, 31*c*, respectively, having a cross-sectional configuration preferably comprising an essentially parabolic or circular macro-scale shape in the paraxial region, i.e., having an essentially parabolic or circular optical effect in relation to the source of radiation 20, each of the inner surfaces 31*a*, 31*b*, 31*c* being able to direct the curing radiation in at least one predetermined radiating direction.

In FIG. 5, the sections 30*a*, 30*b*, 30*c* of the reflector 30 are arranged such that the first radiating direction U1, the second radiating direction U2, and the third radiating direction U3 are substantially parallel in the cross-section, i. e., the first plurality of reflective facets 35*a*, the second plurality of reflective facets 35*b*, and the third plurality of reflective facets 35*c* direct the curing radiation Ra, Rb, and Rc, respectively, in substantially the same radiating direction U1 parallel to U2 parallel to U3 in the cross-section.

In contrast with FIG. 5, in FIGS. 6 and 7 the sections 30*a*, 30*b*, 30*c* of the reflector 30 are arranged such that the first radiating direction U1, the second radiating direction U2, and the third radiating direction U3 are not parallel in the cross-section. Of course, the sections 30*a*, 30*b*, 30*c* may be arranged such that one radiating direction (for example, the second radiating direction U2) is substantially parallel to only one (for example, the third radiating direction U3) of the other two radiating directions in the cross-section, as shown in FIG. 9. If desired, one of the sections (for example, the third section 30*c*, as shown in FIG. 8) may be in a non-reflecting position, i. e., positioned such as to be effectively excluded from reflecting the curing radiation.

It should be pointed out that in the present application, the references to the "cross-sectional axis," "common focal point," shape of the inner surface 31, direct rays D, reflected rays R, radiating directions U, and the like elements which are particularly relevant when viewed in the cross-section, should normally be considered in the context of the cross-section shown in FIGS. 3 and 5–9, unless otherwise indicated.

As shown in FIGS. 1 and 2, the elongate reflective facets 35 are oriented in and substantially parallel to the longitudinal direction. As has been described hereinabove, in the cross-section, the plurality of facets 35 reflects the radiation (direct rays D) being emitted by the radiation source 20 such that the majority of the reflected rays R are substantially parallel to at least one radiating direction U. One skilled in the art will readily understand that the number and shape of the facets 35 is dictated primarily by the desired resolution, or fidelity, of the plurality of facets 35 to the cross-sectional parabolic or circular macro-scale shape. The individual facets 35 may be planar (i. e., having a planar reflective surface 35*s*), or have other shapes, for example, a curvilinear shape. Regardless of the shape of the facets 35, the inner surface 31 (FIG. 3), or each of the inner surfaces 31*a*, 31*b*, 31*c* (FIGS. 5–9) preferably has either a circular macro-scale shape or a parabolic macro-scale shape in the cross-sectional paraxial region. Outside the paraxial region, the inner surface 31 (FIG. 3), or each of the inner surfaces 31*a*, 31*b*, 31*c* (FIGS. 5–9) preferably has a parabolic macro-scale shape.

Any suitable means of joining the facets 35 to the reflector 30 may be used to mount the facets 35 to form the inner surface 31. For example, the reflector 30 may have a plurality of individually adjustable housings therein (not shown), each individual housing receiving each individual facet 35 such that each individual facet 35 is adjustable in the cross-section. Alternatively, a pivotal means 61, schematically shown in FIG. 5, may be utilized for rotatably joining the individual facets 35 to the reflector 30 such that each individual facet 35 is rotatably adjustable in the cross-section.

According to the present invention, the source of radiation 20 is elongate in the longitudinal direction (FIGS. 1, 2, and 10) and is preferably juxtaposed with the common focus F in the cross-section (FIGS. 3, and 5–9). More preferably, viewed in the cross-section, the radiation source 20 is disposed at the common focus F located at the cross-sectional axis 33. As has been shown above, when the radiation source 20 is disposed at the common focus F in the cross-section, the reflector 30 directs the radiation emitted from the radiation source 20 and reflected from the plurality of facets 35 in the direction substantially parallel to at least one radiating direction.

The source of radiation 20 is preferably movable in the cross-section. As an example, FIG. 8 shows (in phantom lines) the source of radiation 20 located in a position different from the position at the cross-sectional axis 33. The ability of the source of radiation 20 to move in the cross-section, in combination with the adjustability of the individual sections 30*a*, 30*b*, 30*c* and independent adjustability of their respective facets 35*a*, 35*b*, 35*c* helps to facilitate a more precise position of the source of radiation in the cross-section and to more easily create an arrangement which provides the curing radiation directed in one or more predetermined radiating directions.

The preferred source of radiation 20 is an elongate exposure lamp, or bulb, extending in the longitudinal direction between the first end 34 and the second end 36 of the reflector 30. Viewed in the cross-section, the source of radiation 20 emits actinic radiation rays in the directions schematically indicated by the directional arrows D. The source of radiation 20 is selected to provide radiation primarily within the wavelength which causes curing of a liquid photosensitive resin 43 to produce a resinous framework 48. Preferably, the source of radiation 20 generates an actinic curing radiation. That wavelength is a characteristic of the liquid photosensitive resin 43. As described above, when the liquid photosensitive resin 43 is exposed to the radiation of the appropriate wavelength, curing is induced in the exposed portions of the resin 43. Curing is generally manifested by a solidification of the resin in the exposed areas. Conversely, the unexposed regions remain fluid and are removed (for example, washed away) thereafter.

Any suitable source of curing radiation 20, such as mercury arc, pulsed xenon, electrodeless, and fluorescent lamps, can be used. The intensity of the radiation and its duration depends on the degree of the curing required in the exposed areas. The absolute values of the exposure intensity and time depend upon the chemical nature of the resin, its photosensitivity characteristics, the thickness of the resin coating, and the pattern selected. For the preferred resin, Merigraph resin EPD 1616, this amount ranges from approximately 100 to approximately 1,000 millijouies/$cm^2$.

Optionally, the apparatus 10 of the present invention may have a radiation management device 21 juxtaposed with the source of radiation 20. The radiation management device 21 preferably comprises an elongate mini-reflector having a concave cross-sectional shape and a reflective surface facing the source of radiation 20, as shown in FIGS. 5–9 and 13. The radiation management device 21 comprising an elongate mini-reflector directs some of the radiation D emitted by the source of radiation 20 towards the reflective facets 35. Alternatively or additionally, the radiation management device 21 may comprise a non-reflective device which blocks the direct radiation D in the directions other than those which are desired, i. e., other than those which are directed towards the reflective facets 35. Regardless of the specific embodiment, the radiation management device 21 prevents the photosensitive resin 43 from receiving the direct radiation D having undesirable directions. Thus, the direct (and presumably non-parallel) radiation D from the source of radiation 20 does not interfere with the controlled reflected radiation R having at least one predetermined radiating direction. If the apparatus 10 of the present invention comprises the preferred source of radiation 20 which is movable in the cross-section, it is preferred that the radiation management device 21 be also movable—concurrently with the source of radiation. Methods of connecting the source of radiation 20 and the radiation management device 21 are well known in the art and are not critical for the present invention.

Figure 13:
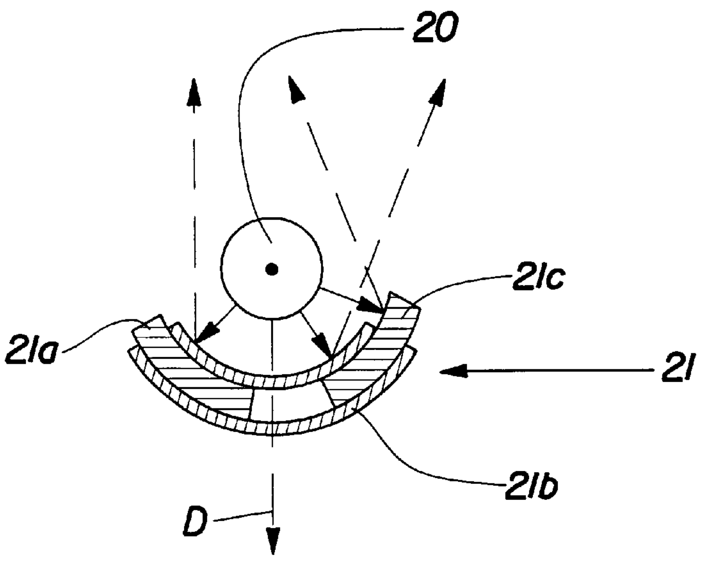
FIG. 13 is a schematic cross-sectional view of an extendible radiation management device comprising three segments slidably interconnected.
Figure 14:
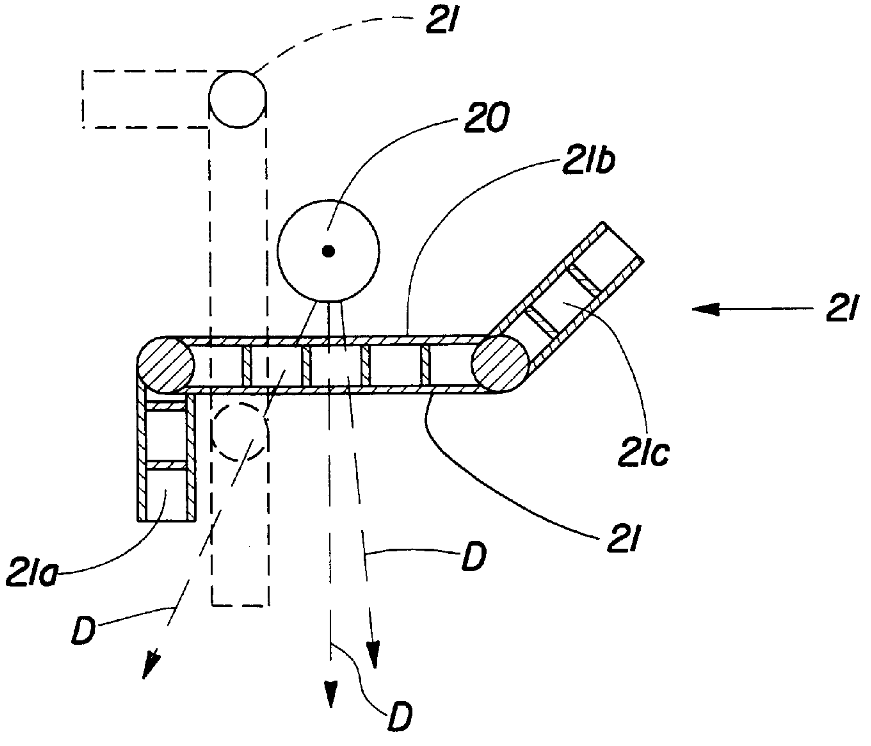
FIG. 14 is a schematic cross-sectional view of a radiation management device comprising three segments pivotally interconnected.

The radiation management device 21 may be stationary relative to the source of radiation 20. Preferably, however, the radiation management device 21 is movable, and more preferably rotatable, relative to the source of radiation 20, as shown in FIGS. 8 and 14. Moreover, the radiation management device 21 is preferably extendible in the cross-section. as shown in FIGS. 13 and 14. The extendible radiation management device 21 controls an effective reflective area of the device 21 (in the case of reflective radiation management device 21), or an effective blocking area of the device 21 (in the case of non-reflective radiation management device 21). As used herein, the term "effective reflective area" of the reflective radiation management device 21 indicates that portion of the reflective area of the device 21, which portion reflects the direct radiation emitted by the source of radiation 20 and directs the reflected radiation towards the facets 35. By analogy, the "effective blocking area" of the non-reflective radiation management device 21 is that portion of the device 21, which portion absorbs, without reflecting, the direct radiation emitted by the source of radiation 20. The examples of the extendible radiation management device 21 include, but are not limited to, the structures comprised of two or more segments which are movable relative each other. For example, FIGS. 13 and 14 show the extendible radiation management device 21 comprising three segments 21*a*, 21*b*, and 21*c*, slidably (FIG. 13) and pivotally (FIG. 14) interconnected. A portion of the radiation management device 21, for example, the segment 21*b* in FIGS. 13 and 14, may be transparent to let the radiation D pass through the segment 21*b*. In FIG. 14, the transparent segment 21*b* may comprise a lens or a mini-collimating element—for directing the radiation D in a desired direction. Other permutations of the radiation management device 21 are also possible.

Figure 10:
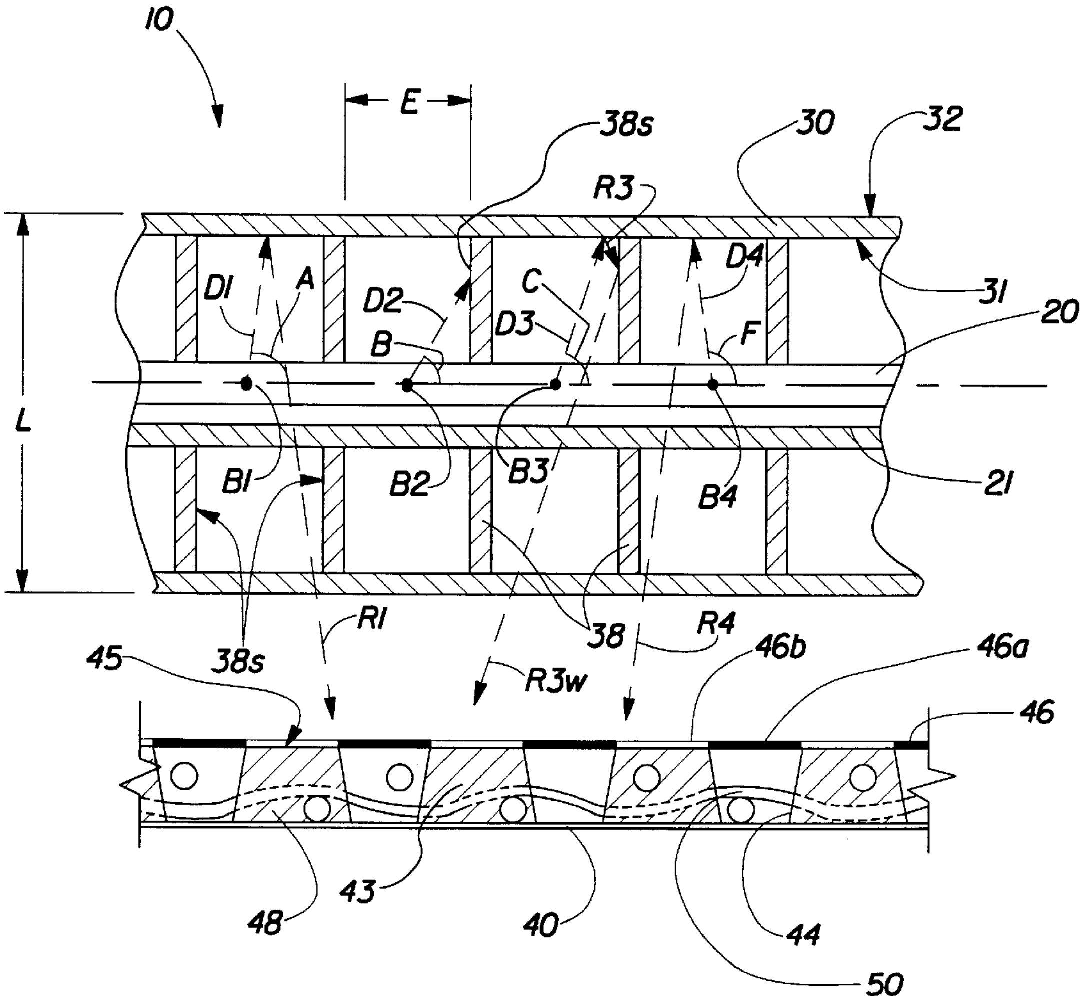
FIG. 10 is a fragmentary schematic side elevational view similar to that shown in FIG. 2, and showing the effect of collimating elements on a longitudinal distribution of curing radiation.

Preferably, the apparatus 10 of the present invention has a plurality of collimating elements 38 disposed between the first end 34 and the second end 36 of the reflector 30, as shown in FIGS. 2 and 10, for controlling a longitudinal distribution of the curing radiation. In FIG. 10, the symbol "E" indicates a distance between two adjacent collimating elements 38 measured in the longitudinal direction; and the symbol "L" indicates a "vertical" dimension of the collimating element 38, i. e., the dimension which is parallel to the cross-sectional axis 33. By controlling the distance E between the adjacent collimating elements 38, and/or the "vertical" dimension L of the collimating elements 38, it is possible to effectively control an angle of the radiation relative to the longitudinal direction of the apparatus 10.

Several examples are schematically illustrated in FIG. 10 with regard to the effect of the collimating elements 38 on the longitudinal distribution of the curing radiation. In FIG. 10, a direct ray D1 is originated at a point B1 located at the source of radiation 20. An angle A between the direct ray D1 and the longitudinal direction is such that when the direct ray D1 reflects from the inner surface 31 of the reflector 30, a reflected ray R1 reaches the surface 45 of the photosensitive resin 43 without interference from the collimating elements 38. The same effect is reached with regard to the direct ray D4 originating at a point B4 at an angle F relative to the longitudinal direction: the reflected ray R4 reaches the surface 45 of the resin 43 without interference from the collimating elements 38.

In contrast with the rays D1 and D4, rays D2 and D3 emitted from points B2 and B3, respectively, are affected by the collimating elements 38. The ray D2 having an angle B relative to the longitudinal direction directly hits the collimating element 38. The ray D3 having an angle C relative to the longitudinal direction reflects from the inner surface 31 of the reflector 30, and the reflected ray R3 hits the collimating element 38.

Each of the collimating elements 38 have two opposing surfaces 38*s* which may be reflective or—alternatively—subtractive. The collimating elements 38 having subtractive surfaces 38*s* are defined herein as subtractive collimating elements 38 and are illustrated in conjunction with the ray D2 in FIG. 10, where the ray D2 is substantially absorbed by the subtractive collimating element 38. The collimating elements 38 having reflective surfaces 38*s* are defined herein as reflective collimating elements 38 and are illustrated in FIG. 10 in conjunction with the ray D3, a ray R3 reflected from the inner surface 31, and a ray R3* reflected from the collimating element 38.

Figure 11:
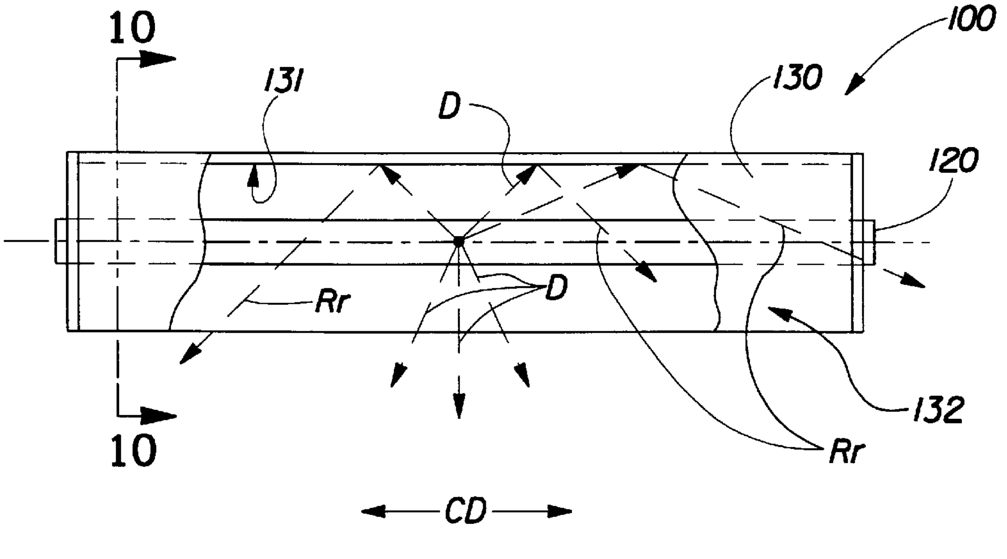
Fig. 11 PRIOR ART
FIG. 11 is a schematic side elevational view of an apparatus comprising a reflector of a prior art.
Figure 12:
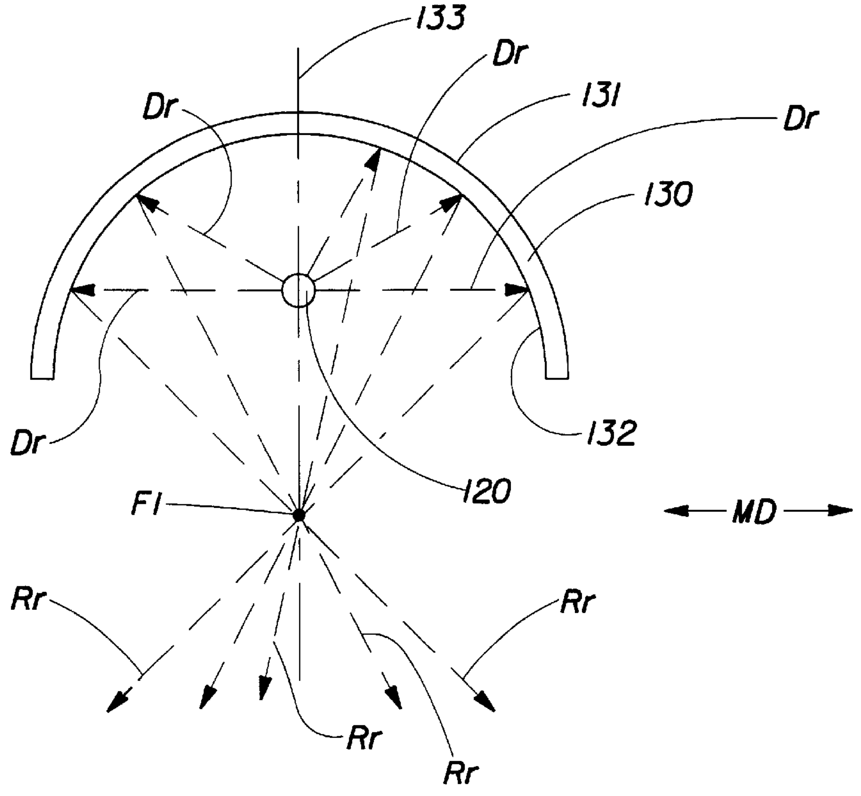
Fig. 12 PRIOR ART
FIG. 12 is a cross-section of the apparatus of the prior art taken along the lines 10—10 of FIG. 9.

For comparison, FIGS. 11 and 12 schematically show a prior art apparatus 100 for curing a photosensitive resin. In the cross-section shown in FIG. 12, the apparatus 100 of the prior art comprises a reflector 130 having an elliptical inner surface 131 and a source of radiation 120 disposed at an axis 133 of the reflector 130. The direct rays Dr from the source of radiation 120 are reflected from the elliptical surface 131 and converge at a point F1. The reflected rays Rr then diverge, and the majority of the reflected rays Rr strike the subtractive collimator 47 which blocks a large amount of the reflected rays Rr. It is estimated that in the existing apparatus 100, more than 50% of a total energy received by the resin being cured is a reflected energy. Therefore, the elliptical shape of the reflector 130 of the prior art causes a substantial loss of the total curing energy due to the substantial loss of the reflected energy in the collimator.

In addition to converging in the cross-section, many of the reflected rays Rr of the apparatus 100 of the prior art have angles relative to the longitudinal direction, which angles may be undesirable with regard to curing a photosensitive resin.

In contrast with the prior art apparatus 100, in the apparatus 10 of the present invention the majority of the reflected rays R are substantially parallel to at least one radiating direction in the cross-section and therefore do not converge/diverge before reaching the radiation-facing surface 45 of the resin 43. Also, the collimating elements 38 effectively control the angle of radiation relative the longitudinal direction of the apparatus 10, as shown in FIG. 10.

As has been pointed out in the Background of the Invention, the elliptical shape of the prior art reflector 130 may be essential for maximizing the amount of energy necessary for effective functioning of the bulbs utilized in the existing apparatus 100. But at the same time, the elliptical shape of the prior art reflector 130 cannot produce the desired parallel reflected rays. The present invention combines the geometrically elliptical shape of the reflector 30 with the optically parabolic or circular macro-scale shape of the inner surface 31 of the reflector 30. Thus, the present invention effectively eliminates interdependency between the microwave energy essential for the effectiveness of the source of radiation 20 and parallel radiation essential for the effectiveness of the curing process. In other words, the apparatus of the present invention effectively decouples a geometrical cross-sectional shape of the reflector 30 from he reflector's optical effect.

Also, space constraints may prevent an equipment manufacturer from making a reflector having a geometrically parabolic or circular cross-sectional shape. Still, by eliminating interdependency between a geometrical shape of the reflector 30 and the reflector's optical effect, the apparatus 10 of the present invention generates parallel radiation regardless of a particular overall cross-sectional shape of the reflector 30. FIGS. 5–9 show the reflector 30 having an essentially flat (as opposed to concave) geometrical cross-section of each of the reflector's sections 30*a*, 30*b*, 30*c*. Nevertheless, the inner surfaces 31*a*, 31*b*, 31*c* comprised of the pluralities of reflective facets 35*a*, 35*b*, 35*c*, respectively, preferably have a parabolic or circular macro-scale shape, as it has been explained above.

FIG. 3 and 5–10 schematically illustrate an arrangement in which a coating of the photosensitive resin 43 is disposed on a working surface 40. The radiation-facing surface 45 of the photosensitive resin 43 is substantially parallel to the longitudinal direction. A reinforcing structure 50 is positioned between the radiation-facing surface 45 of the resin 43 and the working surface 40.

During the curing (i. e., solidification) of the resin 43, the reinforcing structure 50 becomes joined to, or encased in, the resinous framework 48 comprised of the cured resin 43.

In FIG. 3 and 5–9, the dashed lines 44 schematically indicate the effect of the curing radiation on the resin 43, i. e., the lines 44 show (future) walls of the deflection conduits of the resinous framework 48 comprised of the cured resin 43, after the resin 43 has been solidified and the uncured portions of the liquid resin 43 have been removed.

The mask 46 having opaque regions 46*a* and transparent regions 46*b* of a preselected pattern is positioned between the source of radiation 20 and the radiation-facing surface 45 of the photosensitive resin 43. Preferably, the mask 46 is in contacting relation with the radiation-facing surface 45 of the photosensitive resin 43. Alternatively, the mask 46 may be positioned at a finite distance from the radiation-facing surface 45 of the resin 43. The mask can be made from any suitable material which can be provided with the opaque regions 46*a* and the transparent regions 46*b*.

Optionally, a subtractive collimator 47 positioned between the mask 46 and the source of radiation 20, as shown in FIG. 3, may be utilized, as well as other means of controlling the direction and intensity of the curing radiation. The other means (not shown) of controlling the intensity and direction of the curing radiation include refractive devices (i. e., lenses), and reflective devices (i. e., mirrors).

One preferred process of curing the photosensitive resin 43 is a continuous process disclosed in the commonly assigned U.S. Pat. No. 5,514,523 referenced hereabove. In the continuous process, a coating of a liquid photosensitive resin is preferably applied to the reinforcing structure 50 preferably comprising an endless loop.

FIGS. 6, 8, and 9 show the preferred arrangements in which the longitudinal direction of the apparatus 10 of the present invention is perpendicular to the machine direction MD, i. e., the direction in which the coating of the photosensitive resin 43 is traveling. FIG. 7 shows the arrangement in which the longitudinal direction of the apparatus 10 of the present invention is parallel to the machine direction MD. The dashed lines 44*a*, 44*b*, 44*c* schematically indicate the effect of the controlled radiation produced by the corresponding sections 30*a*, 30*b*, 30*c*, respectively. As will be explained hereinbelow in greater detail, some of the dashed lines 44 schematically indicate (future) walls of the conduits of the (future) resinous framework 48 comprised of the cured resin 43, after the resin 43 will have solidified and the uncured portions of the liquid resin 43 will have been removed.

One skilled in the art will understand that when the longitudinal direction of the apparatus 10 of the present invention is parallel to the machine direction MD (FIG. 7), it might be necessary to selectively attenuate the intensity of the curing radiation Ra, Rb, Rc in the cross-machine direction such as to level-out the cross-sectional distribution of the curing radiation, particularly when with resins sensitive to overcuring. Alternatively or additionally, resins insensitive to overcuring could be preferably used in the arrangement shown in FIG. 7. Also, the relative reflectivity of some of the reflective facets 35 can be differentiated such as to compensate the differences in the relative intensity of the corresponding portions of the curing radiation Ra, Rb, Rc.

It might also be desirable to provide radiation-subtractive walls 39 (FIG. 7) separating the portions of the curing radiation (Ra, Rb, Rc) having different directions (U1, U2, U3, respectively)—to restrict the mutual interference between these portions of the curing radiation.

Likewise, one skilled in the art will understand that the apparatus 10 of the present invention, when used as shown in FIG. 7, may preferably have more than three sections shown in FIGS. 5–9. The number of the movable sections of the reflector 30 may be increased as desired, to more closely approximate the preferred parabolic or circular macro-scale shape of the reflector 30.

In a fragment of a continuous process shown in FIGS. 6, 8, and 9, the photosensitive resin 43 is traveling in the machine direction MD from left to right under the apparatus of the present invention. The resin 43 is first subjected to the radiation Ra generated in the first radiating direction U1 by the first inner surface 31*a* which is formed by a first plurality of reflective facets 35*a*. The effect of the radiation Ra is schematically shown by the dashed lines 44*a*. Then, the resin 43 is successively subjected to the radiation Rb generated in the second radiating direction U2 by the second inner surface 31*b* which is formed by a second plurality of reflective facets 35*b*. The effect of the radiation Rb is schematically shown by the dashed lines 44*b*. Finally, the resin 43 is successively subjected to the radiation Rc generated in the third radiating direction U3 by the third inner surface 31*c* formed by a third plurality of reflective facets 35*c*. The effect of the radiation Rc is schematically shown by the dashed lines 44c. The final walls of the knuckles of the cured resinous framework 48 are therefore represented by the dashed lines 44*a* and 44*c*, as best illustrated in FIG. 6. It should be noted that in the arrangements shown in FIGS. 6, 8, and 9, some portions of the resin 43 may be "double-cured" as being subjected to both the radiation Ra and the radiation Rb (portion 43*d* in FIG. 6), or even "triplecured" as being subjected to the radiation Ra, the radiation Rb, and the radiation Rc (portion 43*t* in FIG. 6). Of course, it is not required that the resin 43 be subjected to the radiation Ra, Rb, Rc successively. One skilled in the art will recognize that an arrangement is possible in which the resin 43 is subjected to the radiation Ra, Rb, Rc concurrently.

In the arrangement shown in FIG. 8, only two sections the first section 30*a* and the second section 30*b*—generate the curing radiation in the first radiating direction U1, and the second radiating direction U2, respectively. The third section 30*c* is positioned such that it is excluded from the process of generating the curing radiation. Optionally, the radiation management device 21 may be positioned such as to direct the radiation towards only the first section 30*a* and the second section 30*b*, blocking the radiation from the direction towards the third section 30*c*, as shown in FIG. 8. The final walls of the knuckles of the cured resinous framework 48 are therefore represented in FIG. 8 by the dashed lines 44*a* and 44*b*.

In the arrangement shown in FIG. 9, the second section 30*b* generates the curing radiation Rb in the second radiating direction U2, and the third section 30*c* generates the curing radiation Rc in the third radiating direction U3 which is parallel to the second radiating direction U2. The final walls of the knuckles of the cured resinous framework 48 are represented by the dashed lines 44*a* and 44*b*/44*c*, the lines 44*b* and 44*c* being coincident.

In contrast with the foregoing arrangements, in the arrangement schematically shown in FIG. 7, the longitudinal direction of the apparatus 10 is parallel to the machine direction MD in which direction the photosensitive resin 43 is traveling. As FIG. 7 illustrates, this arrangement allows to create zones of angled knuckles having different directional orientation. A zone Ha is a portion of the resin 43 subjected to the curing radiation Ra having the first radiating direction U1 and generated by the first inner surface 31*a* formed by the first plurality of reflective facets 35*a*. Analogously, a zone Hb is a portion of the resin 43 subjected to the curing radiation Rb having the second radiating direction U2 and generated by the second inner surface 31*b* formed by the second plurality of reflective facets 35*b*; and a zone Hc is a portion of the resin 43 subjected to the curing radiation Rc having the third radiating direction U3 and generated by the third inner surface 31*c* formed by the third plurality of reflective facets 35*c*.

The arrangement shown in the FIGS. 3 and 5–10 illustrates a continuous process of curing the photosensitive resin 43. However, other arrangements utilizing the apparatus 10 of the present invention may be feasible. For example, the resin 43 and the reinforcing structure 50 may be disposed in a bath.

It should also be readily apparent to one skilled in the art that the present invention is not limited to the reflector 30 having three sections. The reflector 30 having fewer or more than three sections may be utilized, if desirable, in the present invention. Nor does the present invention require that all the reflective facets 35 of a certain section of the reflector 30 direct the curing radiation in one radiating direction. If desired, some of the reflective facets 35 of a certain section may be adjusted such as to direct the radiation in one radiating direction (for example, the first radiating direction U1), while the other reflective facets of the same section may be adjusted such as to direct the radiation in the other radiating direction (for example, the second radiating direction U2 or/and the third radiating direction U3). This embodiment is not illustrated but may easily be visualized by pretending that the sections 30*a*, 30*b*, 30*c* of the reflector 30 shown in FIGS. 6, 7, and 9 are not movable relative each other, and the radiating directions U1, U2, and U3 of the curing radiation Ra, Rb, and Rc, respectively, may be controlled only by adjusting the individual reflective facets 35.

It should also be appreciated that the radiating directions U1, U2, U3 indicate those directions in which a significant majority of the curing radiation is directed. One skilled in the art should readily understand that given the nature of the subject, i.e., wave-particle duality of radiation and its possible refraction (such for example as the refraction at layers of air of different temperatures), it is virtually impossible to direct 100% of the radiation in a given direction. Therefore, as used herein, when it is said that the curing radiation is "substantially parallel" to a certain radiating direction, it is meant that the significant majority of the curing radiation is parallel to that radiating direction.

The apparatus 10 of the present invention can be used for curing the photosensitive resin 43 to produce different types of the resinous framework 48. For example, U.S. Pat. No. 4,528,239 and U.S. Pat. No. 4,529,480 referenced above disclose the framework having an essentially continuous network. At the same time, the commonly assigned U.S. Pat. No. 5,245,025 issued to Trokhan et al. on Sep. 14, 1993 and U.S. Pat. No. 5,527,428 issued to Trokhan et al. on Jun. 18, 1996 disclose the framework comprised of a patterned array of protuberances. The foregoing patents are incorporated herein by reference for the purpose of showing different types of the framework 48 which could be produced using the apparatus 10 of the present invention.

What is claimed is:

1. A process for curing a photosensitive resin, said process comprising the steps of:
   (a) providing an apparatus for curing a photosensitive resin, said apparatus comprising:
      a source of radiation; and
      an elongate reflector for directing radiation from said source of radiation in at least one radiating direction, said reflector having a first end and a second end spaced apart from said first end in a longitudinal direction, and a cross-section perpendicular to said longitudinal direction, said reflector further having an inner surface and an outer surface, said inner surface comprising a plurality of elongate reflective facets oriented parallel to said longitudinal direction, said reflective facets being adjustable in said cross-section;
   (b) providing a liquid photosensitive resin; and
   (c) curing said photosensitive resin with a curing radiation from said apparatus to produce a resinous framework.

2. The process according to claim 1, wherein in step (a) said reflective facets of said apparatus are adjustable for directing said radiation substantially parallel to at least one radiating direction in said cross-section.

3. The process according to claim 2, wherein in step (a) said reflective facets are rotatably adjustable in said cross-section of said reflector.

4. The process according to claim 3, wherein in step (a) said source of radiation comprises at least one elongate bulb disposed in said longitudinal direction between said first end and said second end of said reflector.

5. The process according to claim 4, wherein in step (a) said radiation comprises an actinic curing radiation.

6. The process according to claim 5, wherein in step (a) said inner surface of said reflector is flexible in said cross-section.

7. The process according to claim 6, wherein said inner surface of said reflector comprises at least a first section and a second section movably connected to said first section, said first section having a first plurality of reflective facets for directing said radiation substantially parallel to a first radiating direction, and said second section having a second plurality of reflective facets for directing said radiation substantially parallel to a second radiating direction.

8. The process according to claim 7, wherein said inner surface of said reflector further comprises a third section movably connected to at least one of said first section and said second section, said third section having a third plurality of reflective facets for directing said radiation substantially parallel to a third radiating direction.

9. The process according to claim 8, wherein said first radiating direction, said second radiating direction, and said third radiating direction are not parallel to each other.

10. The process according to claim 9, wherein said first radiating direction is parallel to at least one of said second radiating direction and said third radiating direction.

11. The process according to claim 8, wherein at least one of said first plurality of reflective facets, said second plurality of reflective facets, and said third plurality of reflective facets form a substantially parabolic macro-scale shape in said cross-section.

12. The process according to claim 6, wherein in step (a) said reflector further has a plurality of collimating elements disposed between said first end and said second end of said reflector for controlling an angle of said radiation relative to said longitudinal direction.

13. The process according to claim 12, wherein said collimating elements comprise subtractive collimating elements.

14. The process according to claim 4, wherein said source of radiation is movable in said cross-section.

15. The process according to claim 2, wherein in step (a) said reflector further has a radiation management device juxtaposed with said source of radiation.

16. The process according to claim 15, wherein said radiation management device is rotatable relative said source of radiation.

17. The process according to claim 16, wherein said radiation management device is extendible in said cross-section.

18. The process according to claim 17, wherein said radiation management device comprises an elongate mini-reflector having a concave cross-sectional shape.

19. The process according to claim 16, wherein said radiation management device comprises a transparent portion allowing said curing radiation to pass through said transparent portion.

20. The process according to claim 19, wherein said transparent portion comprises a mini-collimator.

21. The process according to claim 19, wherein said transparent portion comprises a lens.

* * * * *